United States Patent

[11] 3,585,870

| [72] | Inventor | August Reinke<br>Wiedenhofkamp 1, Radevormald,<br>Germany |
|---|---|---|
| [21] | Appl. No. | 831,053 |
| [22] | Filed | June 6, 1969 |
| [45] | Patented | June 22, 1971 |
| [32] | Priority | July 9, 1968 |
| [33] | | Germany |
| [31] | | P 17 63 646.3 |

[54] SWITCH PLUNGER ACTUATING DEVICE
5 Claims, 3 Drawing Figs.

| [52] | U.S. Cl. | 74/107 |
|---|---|---|
| [51] | Int. Cl. | F16h 21/44 |
| [50] | Field of Search | 74/107, 102, 99 |

[56] References Cited
UNITED STATES PATENTS

| 494,502 | 3/1893 | Whitacre | 74/107 |
|---|---|---|---|
| 3,390,921 | 7/1968 | Klimek | 74/107 |

*Primary Examiner*—William F. O'Dea
*Assistant Examiner*—Wesley S. Ratliff, Jr.
*Attorney*—Walter Spruegel ABSTRACT: A switch plunger actuating device having a manually turnable shaft with an eccentric portion, and a plunger-actuating part with an axis and opposite ends, of which one end is adapted for pivotal connection with the plunger, and the other end is in spring-urged engagement with the eccentric shaft portion, with the latter being arranged to engage the adjacent part end at a distance from the axis which remains constant as the shaft is turned.

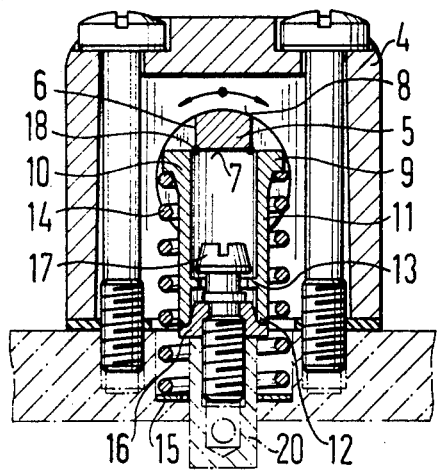
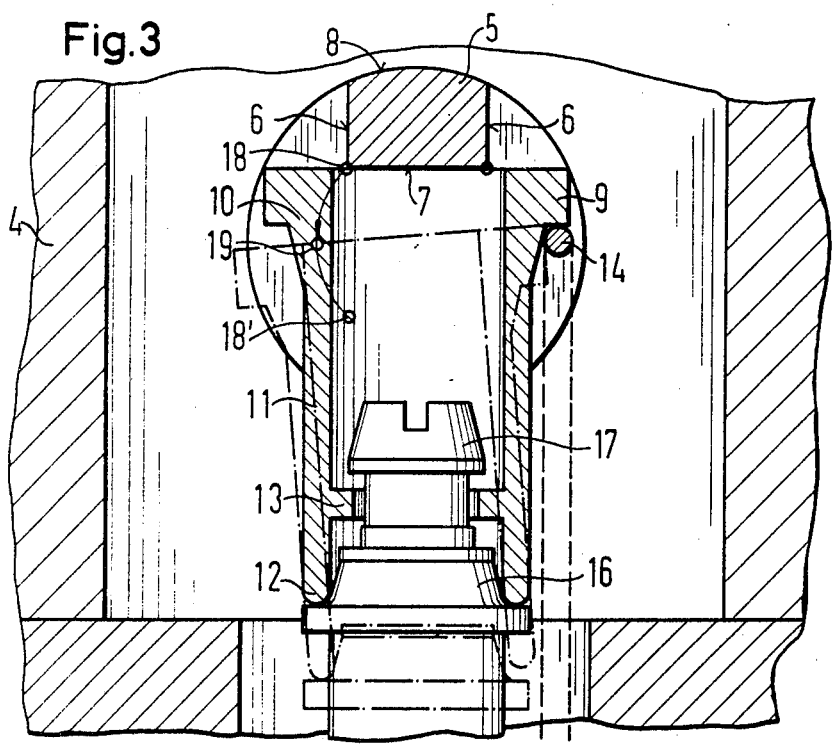

3,585,870

SWITCH PLUNGER ACTUATING DEVICE

The invention relates to actuating devices for electric control switches such as are employed in lifts, lifting vehicles and machine tools, for example, and more particularly to such actuating devices having a shaft turnable by a hand lever and exerting pressure on the depressible switch plunger via an actuating member.

There are already known such devices in which a bent pressure plate has frictional engagement with the switch plunger when the shaft is turned. However, the ensuing friction, which occurs under powerful spring pressure, is quite high and, therefore, extremely detrimental since the effective restoring force is considerably weakened thereby, and the parts rubbing each other are subject to excessive wear. While it is true that the spring force increases when compression occurs, its effective lever arm becomes nevertheless smaller and the friction increases by reason of the strong pressure. In order to mitigate this drawback, attempts have been made to improve the conditions by the choice of more suitable materials for the parts which are in frictional engagement with one another to thereby reduce operational friction and wear. Some results have been obtained by employing certain synthetic materials. However, it has not been possible to eliminate wear in this way, and in particular the restoring moment remained low as before. This decrease in the restoring force becomes particularly pronounced where there are large lever shifts of 90°. Such a lever shift through 90° reduces the effective lever arm so much that in spite of increased spring force the restoring force is insufficient to overcome the friction and return the lever to the inoperative or home position. It should also be noted in this connection that the spring force must necessarily be limited, since excessive preloading of the spring results in breakage of the same and in excessive bearing loads. The shortcomings of these known actuating devices are partly eliminated at the sacrifice of the large lever shift through 90°, i.e., a lever shift of only 45° to 70° is used in such devices.

Other actuating devices of this kind are also known in which a spring-loaded sheet-metal plunger is inserted in a slotted shaft. When the shaft is turned, the sheet-metal plunger is lifted. The plunger, by being spring-urged can follow a switching element and thereby perform a switching action. For return movement, the spring, which surrounds the switching plunger, must then overcome the spring force of the switch element and bring the lever back to home position. While it is true that in this way high friction is eliminated, nevertheless only a relatively small lever shift is possible. Furthermore, in this known arrangement neither the inward movement of the switching plunger nor its return is effected positively. Such a positive return is, however, of great importance particularly in connection with safety switches, since on spring failure or contact sticking no switching operation would occur.

It is, therefore, an object of the invention to eliminate the friction exerted on the switch plunger by virtue of turning the lever, and the thereby ensuing disadvantages, so as to permit a full lever shift through 90° and achieve positive operation of the plunger.

According to the invention, these aims are realized by providing the actuating member in the form of a cap seated on an annular disc on the plunger so that it has pivotal freedom with respect to the plunger, and that part of the shaft which bears on the other end of the cap is arranged eccentrically in relation to the axis of the shaft, and further so that the distance of the point of engagement of the eccentric shaft part with the cap from the central axis of the latter is maintained when the shaft is turned. The lower annular end face of the cap is preferably cross-sectionally rounded and seated on an annular bearing surface in the disc, so that the cap can be tilted about this bearing surface. The eccentric part of the shaft which on rotation of the latter engages the top of the cap is either one or two spaced edges which turn clockwise and anticlockwise, respectively, and either of these edges moves in a path about the axis of rotation of the shaft. At the same time, the cap in follower relation with either one of these edges is tilted clockwise or anticlockwise to a certain extent and is simultaneously forced downwardly in opposition to the spring force while remaining in follower relation with the respective edge without any relative shift between them, so that depression of the switch plunger and, consequently, the switching function is performed. The initial and end positions of the cap differ in their location from one another only by being displaced by the switching distance in a common plane in which the shaft and plunger axes lie. Maximum tilt of the cap is reached when the shaft is in a position 45° from its initial position.

The annular disc is attached to the switch plunger so that the switch plunger is also returned under spring force when the rotary shaft is shifted from the end position to the initial position.

With the arrangement according to the invention lever shift through a full 90° is achieved. Moreover, there is no friction whatsoever between the rotary shaft and the cap since no relative movement occurs between them. Moreover, there is no sacrifice of return power, neither is there any appreciable wear of the parts. Also, there is no effective shortening of the lever arm, since the same has the same effective length in the end position as in the initial position. Further, since the spring force is considerably increased by compression of the spring on a 90° shift of the shaft into the end position, a considerably greater return force is obtained which contributes quite substantially to improved performance. Finally, movement of the plunger is effected without any resilient intermediate element and, therefore, occurs positively in the described manner. Positive switch actuation is absolutely essential for safety switches and must occur independently of any spring force.

An embodiment of the invention is described hereinafter with reference to the drawing.

FIG. 1 is a section of the actuating device according to the invention;

FIG. 3 shows in larger scale certain coacting parts of the device.

Figure 2:
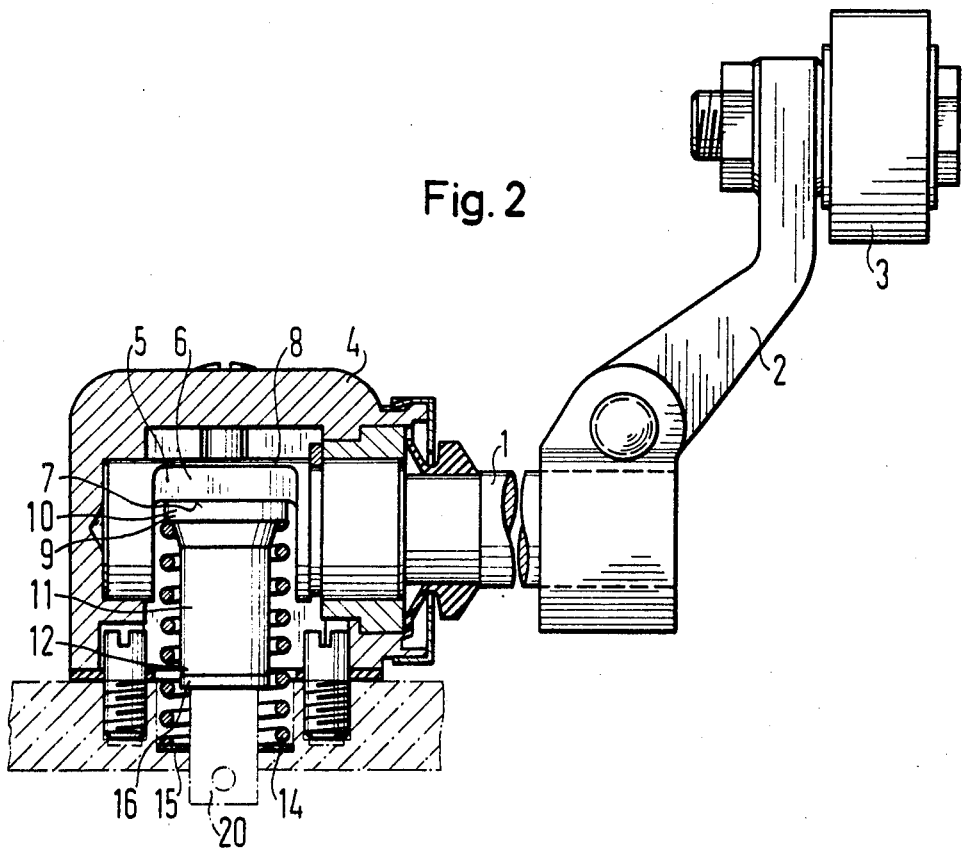
FIG. 2 is another section through the same device.

A rotary shaft 1 has a lever 2 with a handle 3 at its outer end. The shaft 1 is with its opposite ends mounted in a housing 4, and has a part 5 which is arranged eccentrically in relation to the axis of the shaft and, in the embodiment illustrated, has plane side faces 6, a plane bottom face 7, and a curved top face 8. This eccentrically arranged part 5 of the shaft bears, in an initial or home position of the latter, on the top of a cap 9 with its bottom face 7. This cap 9 then extends coaxially with the switch plunger, i.e. in the direction of actuation of the switch. The cap 9, which is the exemplary form of a sleeve, has at its upper end a head portion 10 which tapers downwardly and merges into a shank 11 that is cross-sectionally rounded at its lower end 12. The shank moreover has an inwardly projecting flange 13 which connects cap 9 with the plunger for their joint return movement. One end of a compression spring 14 bears against the widened head portion 10 of the cap 9, while the opposite end of the spring bears against a fixed housing part 15. The rounded end face 12 of the cap 9 is seated on an annular bearing surface of an annular disc 16 which is secured to the switch plunger 20 by a screw 17, for example.

FIG. 3 shows more clearly the fundamental mode of operation of the arrangement according to the invention. The full-line position of the cap 9 represents its initial or home position. The dotted outline of the cap 9 indicates its position when the shaft is turned through 45° in one direction, in this instance anticlockwise. FIG. 3 also shows how the edge 18 shifts from initial position to the 45° position 19, with maximum lateral i.e., tilting, shift of the cap 9 being reached in this position. In this position, the dotted line cap 9 is tilted at an angle of a few degrees, for example 4°, with respect to its initial full-line position or with respect to its end position after 90° turn of the shaft from initial position. In thus turning the shaft through 45° and continuing its rotation through 90°, the cap 9 is with its edge 18 moved downwardly from the full-line position to the position 18' via the position 19, and the switch plunger is moved downwardly the same distance. The edge position 18' is vertically below the full-line position 18, and the vertical distance between the edge positions 18—19 is equal to the vertical distance between the edge positions 19—18'.

In turning the shaft part 5 through 90°, one of the side faces 6 comes to bear against the top of the cap 9, with the annular disc 16 then resting against the housing part 15.

As indicated in the drawing (FIG. 1) by arrows of opposite directions, the shaft 1, and with it the shaft part 5, can be turned in either of two opposite directions, with tilting of the cap 9 taking place in either case about the bearing surface on the disc 16.

I claim:

1. An actuating device for a depressible electric switch plunger, providing a journaled shaft with an axis and a hand lever and an eccentric portion with an edge parallel to and spaced from said axis, and a longitudinal actuating part interposed between said eccentric shaft portion and plunger and having opposite ends of which one end is pivotally connected with the plunger, and the other end is engaged by said edge, whereby on turning said shaft said other part end will follow said edge and said part will be tilted about its pivot connection with the plunger without a relative shift between said edge and its contact with said other part end.

2. An actuating device as in claim 1, which further provides an annular member attached to the plunger and having said pivot connection with said one part end.

3. An actuating device as in claim 2, in which said part is a sleeve and said one end thereof has an annular surface which is cross-sectionally rounded, and said member has an annular bearing surface on which said rounded sleeve end surface rests with pivotal freedom.

4. An actuating device as in claim 1, in which said part has at said other end a shoulder, and there is provided a spring bearing against said shoulder to bias said part against said eccentric shaft portion.

5. An actuating device as in claim 1, in which said eccentric shaft portion has adjacent said other part end opposite edges parallel to, and symmetrical with respect to, said shaft axis, for engagement with said other part end, whereby said other part end will follow either engaging edge and said part will be tilted about its pivot connection with the plunger on turning said shaft in either direction.